(12) United States Patent
Hong et al.

(10) Patent No.: US 7,720,468 B1
(45) Date of Patent: May 18, 2010

(54) POLLING METHODS FOR USE IN A WIRELESS COMMUNICATION SYSTEM

(75) Inventors: Liang A. Hong, Redmond, WA (US);
Kamyar Moinzadeh, Renton, WA (US);
Luong P. Nguyen, Everett, WA (US)

(73) Assignee: Clearwire Legacy LLC, Kirkland, WA (US)

( * ) Notice: Subject to any disclaimer, the term of this patent is extended or adjusted under 35 U.S.C. 154(b) by 1404 days.

(21) Appl. No.: 09/597,016

(22) Filed: Jun. 20, 2000

Related U.S. Application Data (60) Provisional application No. 60/140,959, filed on Jun. 23, 1999.

(51) Int. Cl.
*H04W 24/00* (2009.01)
(52) U.S. Cl. .............. 455/423; 455/574; 455/67.14; 455/88; 370/242; 370/449
(58) Field of Classification Search ................ 455/423, 455/343.1, 343.2, 574, 509, 67.14, 88, 434.1; 370/242, 311, 216, 346, 449, 468, 85.8, 95.2, 370/858
See application file for complete search history.

(56) References Cited

U.S. PATENT DOCUMENTS

| | | | | |
|---|---|---|---|---|
| 3,688,274 | A | * 8/1972 | Cormier et al. ................ 710/5 |
| 4,266,271 | A | * 5/1981 | Chamoff et al. ............. 709/209 |
| 4,638,428 | A | 1/1987 | Gemma |
| 4,882,746 | A | * 11/1989 | Shimada ....................... 455/462 |
| 5,289,160 | A | * 2/1994 | Fiorletta ....................... 340/447 |
| 5,315,636 | A | * 5/1994 | Patel ....................... 379/201.07 |
| 5,410,737 | A | * 4/1995 | Jones ........................... 455/454 |
| 5,483,676 | A | 1/1996 | Mahany et al. ............. 455/67.4 |
| 5,526,357 | A | * 6/1996 | Jandrell ....................... 370/346 |
| 5,570,389 | A | * 10/1996 | Rossi ........................... 375/220 |

(Continued)

FOREIGN PATENT DOCUMENTS

JP          353068103 A  *  6/1978

OTHER PUBLICATIONS

JP10303796A Japan Radio Co LTD, Nov. 1998.*

*Primary Examiner*—Nghi H Ly
(74) *Attorney, Agent, or Firm*—Davis Wright Tremaine LLP; Michael J. Donohue; Heather M. Colburn (57) ABSTRACT

Polling methods for use in a communication system, such as a fixed wireless communication system, are described. The fixed wireless communication system includes at least one wireless base unit and a plurality of fixed-location wireless transceiver units, where each transceiver unit is, for example, located at a home residence and coupled to a personal computer (PC). In one particular polling method, a wireless transceiver unit detects a failure of a primary energy source, switches to a battery backup for power, and sends a message to the wireless base unit indicating such failure. The message initiates the wireless base unit to poll the wireless transceiver unit on a periodic basis for status information. During the failure, a data traffic channel established between the units is torn down to conserve power at the wireless transceiver unit. Once the primary energy source is restored, the data traffic channel is brought back up and the periodic polling is terminated. Similar methods are applied in connection with the detection of a communication failure over the data traffic channel.

17 Claims, 6 Drawing Sheets

U.S. PATENT DOCUMENTS

| | | | | |
|---|---|---|---|---|
| 5,600,635 A * | 2/1997 | Hamaki et al. | | 370/280 |
| 5,697,059 A | 12/1997 | Carney et al. | | 455/34.1 |
| 5,749,052 A * | 5/1998 | Hidem et al. | | 455/406 |
| 5,809,311 A * | 9/1998 | Jones | | 713/300 |
| 5,838,774 A | 11/1998 | Weisser, Jr. | | |
| 5,844,473 A * | 12/1998 | Kaman | | 340/439 |
| 5,907,491 A | 5/1999 | Canada et al. | | 364/468.15 |
| 5,937,358 A * | 8/1999 | Gehrig | | 455/509 |
| 6,014,374 A * | 1/2000 | Paneth et al. | | 370/345 |
| 6,040,786 A * | 3/2000 | Fujioka | | 340/928 |
| 6,058,420 A * | 5/2000 | Davies | | 709/224 |
| 6,108,785 A * | 8/2000 | Poisner | | 713/200 |
| 6,275,497 B1 | 8/2001 | Varma | | |
| 6,301,514 B1 * | 10/2001 | Canada et al. | | 700/108 |
| 6,347,092 B1 * | 2/2002 | Serikawa et al. | | 370/442 |
| 6,349,102 B1 * | 2/2002 | Shibasaki et al. | | 370/463 |
| 6,480,505 B1 * | 11/2002 | Johansson et al. | | 370/449 |
| 6,567,386 B1 * | 5/2003 | Sugaya et al. | | 370/322 |
| 6,594,284 B1 * | 7/2003 | Page et al. | | 370/508 |
| 6,885,862 B1 * | 4/2005 | Pearson | | 455/419 |
| 6,952,420 B1 | 10/2005 | Castellano | | |
| 7,085,553 B1 * | 8/2006 | Harrenstien et al. | | 455/412.2 |

* cited by examiner

POLLING METHODS FOR USE IN A WIRELESS COMMUNICATION SYSTEM

RELATED APPLICATIONS

This application claims the benefit of U.S. Provisional Application No. 60/140,959, filed Jun. 23, 1999, and entitled "Method for Establishing a Communication Channel in a Personal Wireless Access Network," which is incorporated herein in its entirety.

The following applications, assigned to the Assignee of the current invention, and being filed concurrently, contain material related to the subject matter of this application, and are incorporated herein by reference:

D. Gibbons et al., entitled "Methods and Apparatus for Dynamically Assigning Time Slots in a Wireless Communication System," U.S. Ser. No. 09/597,044, filed Jun. 20, 200; and D. Gibbons et al., entitled "Establishing a Communication Channel in a Wireless Network," U.S. Ser. No. 09/597,043, filed Jun. 20,200.

BACKGROUND OF THE INVENTION

1. Field of the Invention

The present invention relates generally to wireless communication systems, such as "fixed wireless systems," utilizing polling techniques.

2. Description of the Related Art

In a "fixed wireless system," a wireless base unit provides for communication of telephone and high-speed data (e.g., Internet data) to each one of a number of subscribers equipped with a wireless transceiver unit at a fixed location, for example, a home residence. The transceiver units are electrically powered at the home residence, and have control and traffic channels available for communication with the wireless base unit. Any problems, such as power or communication failures, for some or all of a large number (e.g., 1000's) of wireless transceiver units served by a wireless base unit need to be handled in an appropriate and efficient manner. In addition, bandwidth is limited and needs to be efficiently utilized. Thus, there is an existing need to efficiently obtain information about and from transceiver units in such systems.

SUMMARY OF THE INVENTION

Polling methods and apparatus for use in a wireless communication system, such as a fixed wireless communication system, are described. The polling method includes the steps of sending, from a wireless base unit, an information request message; receiving, at a wireless transceiver unit, the information request message; sending, from the wireless transceiver unit, information responsive to the information request message; and receiving, at the wireless base unit, the information. The above steps are preferably repeated on a regular or a periodic basis. The information that is polled for may be, for example, status information, configuration data, or call record data.

The polling method may be initiated upon detecting a problem or failure, such as detecting a power failure at the wireless transceiver unit or a communication failure over a data traffic channel available between the wireless base and transceiver units. After detecting such a failure, the data traffic channel may be torn down to conserve power at the wireless transceiver unit. The polling methods may also involve sending an information request message over a broadcast channel, such that a plurality of wireless transceiver units are simultaneously polled. Here, each wireless transceiver unit delays a random period of time before sending its information back to the wireless base unit over a channel that is shared amongst the transceiver units.

DETAILED DESCRIPTION OF THE PREFERRED EMBODIMENTS

Figure 1:
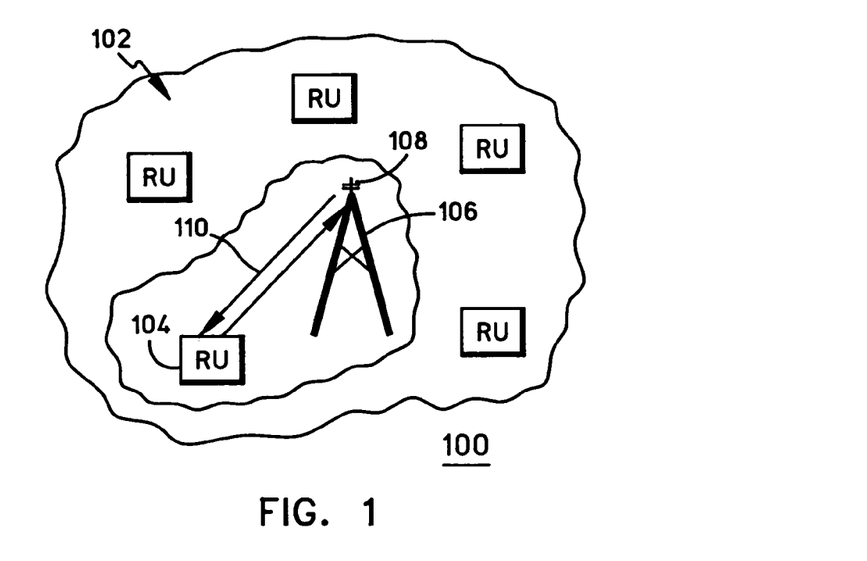
FIG. 1 is an illustration of a wireless communication system which may embody the present invention, the wireless communication system including at least one wireless base unit and a plurality of wireless transceiver units.

FIG. 1 is an illustrative representation of a wireless communication system 100. Wireless communication system 100 includes at least one wireless base unit 106 having one or more antennas 108, and a plurality of remote units 102 ("RUs" or "wireless transceiver units"), such as a wireless transceiver unit 104. Wireless base unit 106 and wireless transceiver units 102 communicate via radio frequency (RF) signals, such as RF signals 110 between wireless base unit 106 and wireless transceiver unit 104. Wireless communication system 100 can make use of a number of additional different communication techniques, such as frequency division multiplexing (FDM) or orthogonal frequency division multiplexing (OFDM). Preferably, wireless communication system 100 is a fixed wireless system (FWS), where wireless base unit 106 provides telephone and high-speed data communication to each one of a number of fixed-location subscribers equipped with a wireless transceiver unit (e.g., at home residences). Here, wireless communication system 100 is a Personal Communication System (PCS) Wireless Access Network (PWAN).

Wireless communication link 110 includes a plurality of channels available between wireless base unit 106 and wireless transceiver units 102. The plurality of channels include one or more control channels, one or more voice traffic channels, and one or more data traffic channels. Voice traffic channels are utilized for bi-directional communication of voice signals, whereas data traffic channels are utilized for bi-directional communication of high speed data, such as Internet data. Each voice traffic channel is dedicated to a voice communication call upon assignment ("circuit-switched" type), whereas each data traffic channel is available for use by multiple transceiver units using a data packet protocol ("packet-switched" type). Voice traffic channels are assigned and active only during voice calls, whereas data traffic channels are typically always active. In the OFDM communication embodiment described, each channel can be identified by a unique combination of frequency and time slots. If there are sixteen frequency slots and eight time slots, for example, one traffic channel may be identified by frequency slot three and time slot seven, another traffic channel may be identified by frequency slot three and time slot two, and even another traffic channel may be identified by frequency slot five and time slot six, etc.

Figure 3:
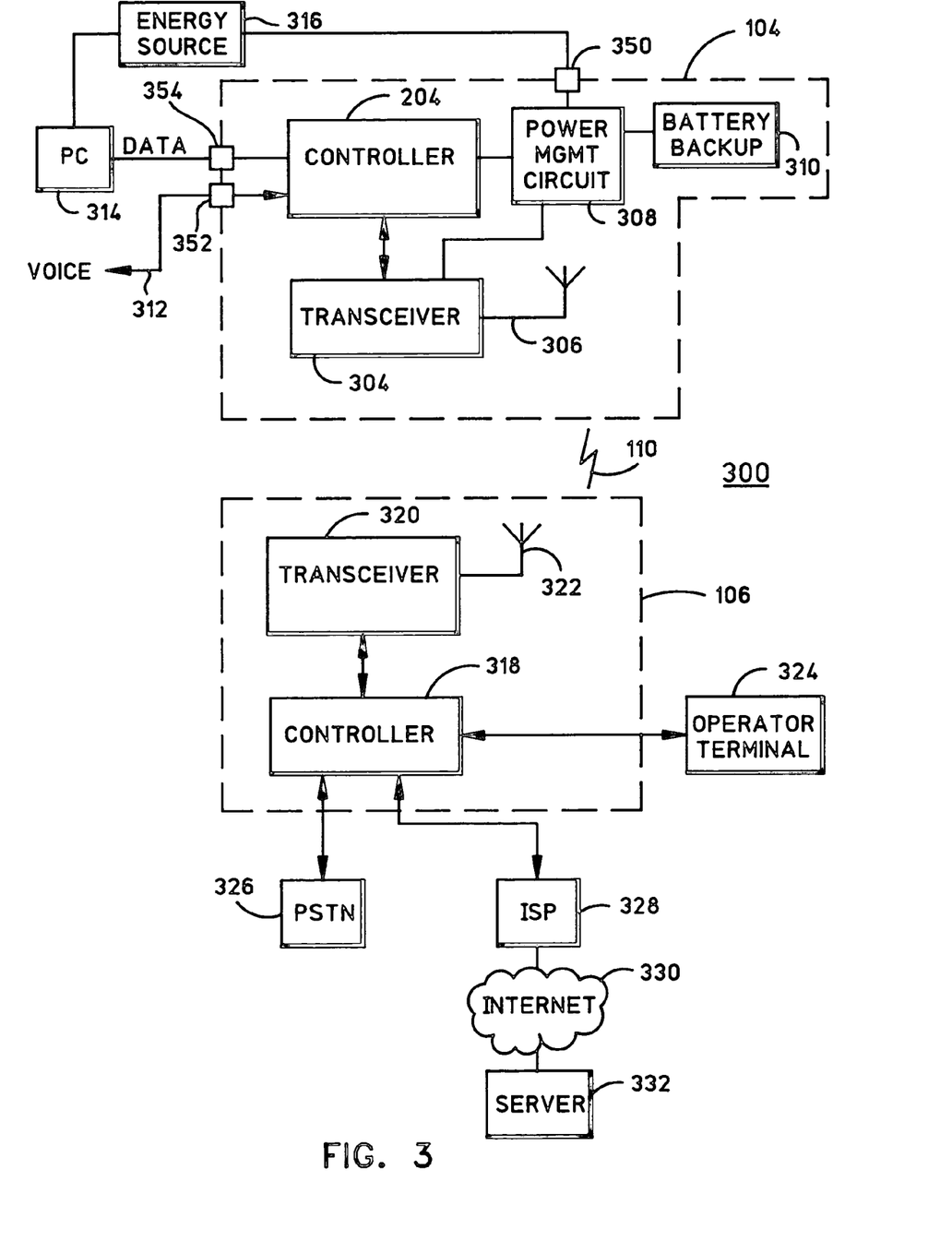
FIG. 3 is a schematic block diagram of a wireless transceiver unit and a wireless base unit of the wireless communication system of FIG. 1.

FIG. 3 is a schematic block diagram of wireless transceiver unit 104 and wireless base unit 106 of wireless communication system 100 of FIG. 1. Wireless transceiver unit 104 includes a controller 302, a wireless transceiver 304, an antenna 306, power management circuitry 308, and battery backup circuitry 310. Wireless transceiver unit 104 also has an energy source interface 350, a telephone interface 352, and a computer interface 354. Energy source interface 350 is adapted for coupling to an energy source 316 that provides electrical power to wireless transceiver unit 104. Telephone interface 352 is used for receiving and sending voice signals 312 of a telephone or voice communication call. Computer interface 354 is adapted for coupling to a personal computer (PC) 314 or other computer device to facilitate communication of high speed data (such as Internet data).

Energy source 316 may be, for example, an alternating current (AC) source provided from an electrical outlet of a home residence. Here, power management circuitry 308 provides conventional AC to direct current (DC) conversion. Power management circuitry 308 receives the electrical energy and provides it in appropriate form to controller 302 and wireless transceiver 304 for electrically powering such circuitry. If energy source 316 becomes unavailable to wireless transceiver unit 104 for some reason (e.g., power outage, plug is pulled, etc.), power management circuitry 308 provides a switching function so that electrical energy is provided from battery backup circuitry 310. Battery backup circuitry 310 includes, for example, an interface (not visible) for coupling to one or more battery cells, such as off-the-shelf DC batteries.

Having similar functionality as wireless transceiver unit 104, wireless base unit 106 includes a controller 318, a wireless transceiver 320, and an antenna 322. An operator terminal 324, such as a PC, may be coupled to wireless base unit 106 to access information from a wireless transceiver unit via polling methods. Operator terminal 324 may be part of a network operating center. Wireless base unit 106 is also coupled to a Public Switched Telephone Network (PSTN) 326 and, for access to the Internet 330, an Internet Service Provider (ISP) 328. Wireless transceiver unit 104 and wireless base unit 106 help facilitate telephone or voice calls for a user over PSTN 326. In addition, wireless transceiver unit 104 and wireless base unit 106 help facilitate data communications for PC 314, which may access one or more servers, such as a server 332, available over the Internet 330.

During a voice call, outbound voice signals spoken by a user are received at controller 302, coded and modulated, and transmitted from transceiver 304 and antenna 306 via RF communication signals. The RF signals are transmitted over one of the dedicated voice traffic channels, received at wireless base unit 106, demodulated and decoded to reproduce the voice signals, and routed accordingly over PSTN 326 to another subscriber. On the other hand, inbound voice signals are received over PSTN 326 by controller 318, coded and modulated, and transmitted from transceiver 320 and antenna 322 via RF communication signals. These RF signals are transmitted over one of the dedicated voice traffic channels, received by wireless transceiver unit 104 at antenna 306 and wireless transceiver 304, demodulated and decoded to reproduce the voice signals for the user to listen to.

During data communications, outbound data packets from PC 314 are received at controller 302, coded, modulated, and transmitted from transceiver 304 and antenna 306 via RF communication signals. The RF signals are transmitted over one of the data traffic channels. These RF communication signals are received at wireless base unit 106, demodulated, and decoded to reproduce the data packets. These data packets are routed accordingly to over the Internet 330 to server 332 via ISP 328. On the other hand, inbound data packets are received from server 332 at controller 318, coded, modulated, and transmitted from transceiver 320 and antenna 322 via RF communication signals. These RF signals are transmitted over a data traffic channel (each of which are shared by multiple transceiver units), received by wireless transceiver unit 104 at antenna 306 and wireless transceiver 304, demodulated, and decoded to reproduce the data packets. The destination addresses must match that assigned to PC 314 for PC 314 to receive the data packets. Under normal operating conditions, the data traffic channel is typically always active and wireless transceiver unit 104 must continuously monitor such channel to receive its data packets.

Figure 2:
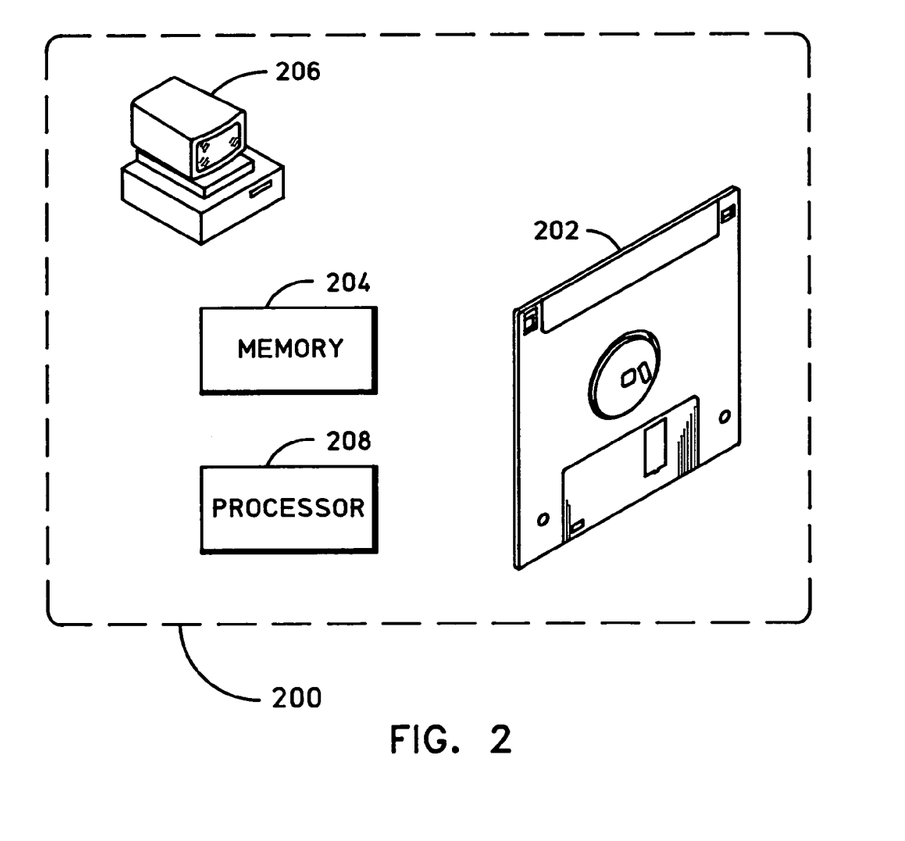
FIG. 2 is an illustration of software components which are suitable for use in implementing the inventive methods described herein.

In such an environment, wireless base unit 106 performs "polling" methods with the plurality of wireless transceiver units 102. Polling is performed to obtain information from wireless remote units 102 to ensure that devices are operating or operating properly, in accordance with some predefined specification. Polling may also be performed to obtain information to facilitate subscriber services, for example, to maintain event logs. Referring to FIG. 2, the methods described herein may be embodied and implemented in wireless transceiver unit 104 and wireless base unit 106 of FIG. 1 (as well as other transceiver and base units) in connection with software using software components 200 shown in FIG. 2. The software may be embedded in or stored on a disk 202 or memory 204, executable on a computer 206 or a processor 208. Thus, the inventive features may exist in a signal-bearing medium which embodies a program of machine-readable instructions executable by a processing apparatus which perform the methods.

The information for which polling is performed may be any suitable information, such as, for example, status information, configuration information, or call record information. Status information may be or include, for example, mere acknowledgement, operating condition information, operating mode information, previous usage information, etc. Configuration information may be or include, for example, reception and transmission parameters for the wireless transceiver unit. Configuration information is typically preprogrammed into and may be unique to each wireless transceiver unit. More particularly, configuration information is typically programmed into an Electrically Erasable/Programmable Read-Only Memory (EEPROM) (not shown) coupled to controller 302 (FIG. 3). Call record information may be or include, for example, an identification of a plurality of telephone calls made and/or received over a period of time, timestamps of the previous calls, durations of the previous calls, the number of previous calls, etc.

A wireless base unit polls one or more wireless transceiver units with use of what is referred to as an information request message. In its simplest form, an information request message merely instructs or requests the sending of information. On the other hand, an information request message may include data indicative of a particular information type. Using the examples above, the information types may include a status type, a configuration data type, and a call record type. Upon receipt of an information request message, a wireless transceiver unit reads the data indicative of the particular type, and selects and/or generates and sends the appropriate information corresponding to that type. The wireless transceiver unit may send all of the information associated with the information type. Each information type, however, may be further divided into subtypes. In call record types, for example, the subtypes may be a call identification type, a call timestamp type, a call duration type, a call number type, etc., each corresponding to particular call record information previously mentioned above. Here, upon receipt of an information request message, a wireless transceiver unit reads the data indicative of the particular information type and subtype, and selects and/or generates and sends only the information corresponding to that subtype within the type.

Figure 4:
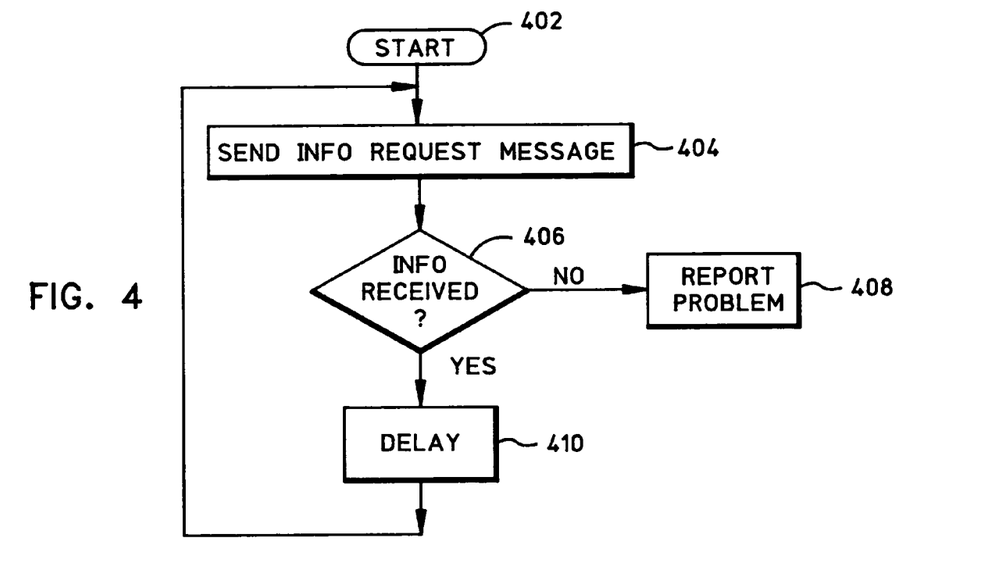
FIG. 4 is a flowchart describing a polling method for use by the wireless base unit.

FIG. 4 is a flowchart describing a general polling method for use by wireless base unit 106 of FIG. 1. Beginning at a start block 402, wireless base unit 106 sends an information request message that is intended for receipt by wireless transceiver unit 104 (step 404). Wireless base unit 106 waits for a response at step 406. If no response is received over some predetermined time period, wireless base unit 106 reports the lack of response to, for example, a database or operator terminal 324. If a response is received at step 406, wireless base unit 106 delays for some predetermined time period (step 410). Upon expiration of the time period, wireless base unit 106 repeats the process beginning at step 404 such that polling is performed on a periodic basis for one or more wireless transceiver units. From the viewpoint of wireless transceiver unit 104, and beginning at a start block 502 of FIG. 5, wireless transceiver unit 104 waits to receive the information request message from wireless base unit 106 (step 504). Upon receipt of such message, wireless transceiver unit 104 selects the appropriate information and sends it to wireless base unit 106 (step 506). This process repeats for each information request message sent from wireless base unit 106, such that polling is performed on a periodic basis For example, the polling may be performed for one or more wireless transceiver units (sequentially or simultaneously) every five minutes.

Figure 5:
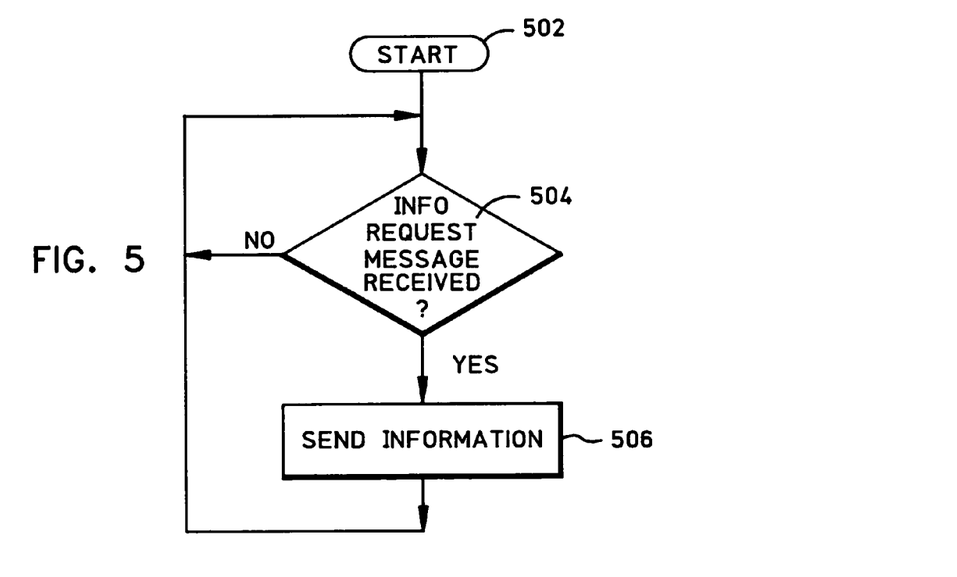
FIG. 5 is a flowchart describing a polling method for use by the wireless transceiver unit which is associated with the flowchart of FIG. 4.

The information request message may include an information type and/or subtype as described above, where wireless transceiver unit 104 must select from several information to send in accordance with the type and/or subtype. In addition, any suitable type of information may be obtained during such polling. In one example, wireless base unit 106 polls for status information. As another example, wireless transceiver unit 104 may store call record information as previously described. This information may be obtained periodically for comparison and updating of call information stored in a database accessible to wireless base unit 106.

As described, polling may be performed on a periodic basis to monitor the status of a number of different wireless transceiver units. The polling need not be "periodic" in a strict sense, however; the polling need only be performed on some regular timed basis. In an alternate embodiment, in lieu of repeating the polling periodically, operator terminal 324 may initiate an "ad hoc" poll when needed. Here, operator terminal 324 sends a message to wireless base unit 106 that causes it to poll a particular wireless base unit for particular information (e.g., using type/sub-type). Here, a single poll is performed per request; that is, no periodic polling is performed. This ad hoc polling may be used, for example, to obtain configuration information of a wireless transceiver unit that is not operating properly. In this application, new configuration information may be obtained by the network operating center where wireless transceiver unit 104 is reprogrammed "over-the-air" to correct the problem. Ad hoc polling may also be employed in combination with the periodic polling described in relation to FIGS. 4 and 5.

If polling for information from a single wireless transceiver unit, then an information request message is sent only to that unit. On the other hand, if the polling is for information from multiple transceiver units, then the information request message is broadcast to all of the units simultaneously. In a slotted ALOHA type system of the preferred embodiment, for example, wireless base unit 106 may use a Common Link channel (CLC) to send the message and a Solicited Common Access channel (S-CAC) to receive the information, such that a single transceiver unit is polled. On the other hand, wireless base unit 106 may use a Broadcast Control channel (BRC) to send the message and an Unsolicited Common Access channel (U-CAC) to receive the information, such that multiple transceiver units are simultaneously polled. This method is described in more detail later below.

Figure 6:
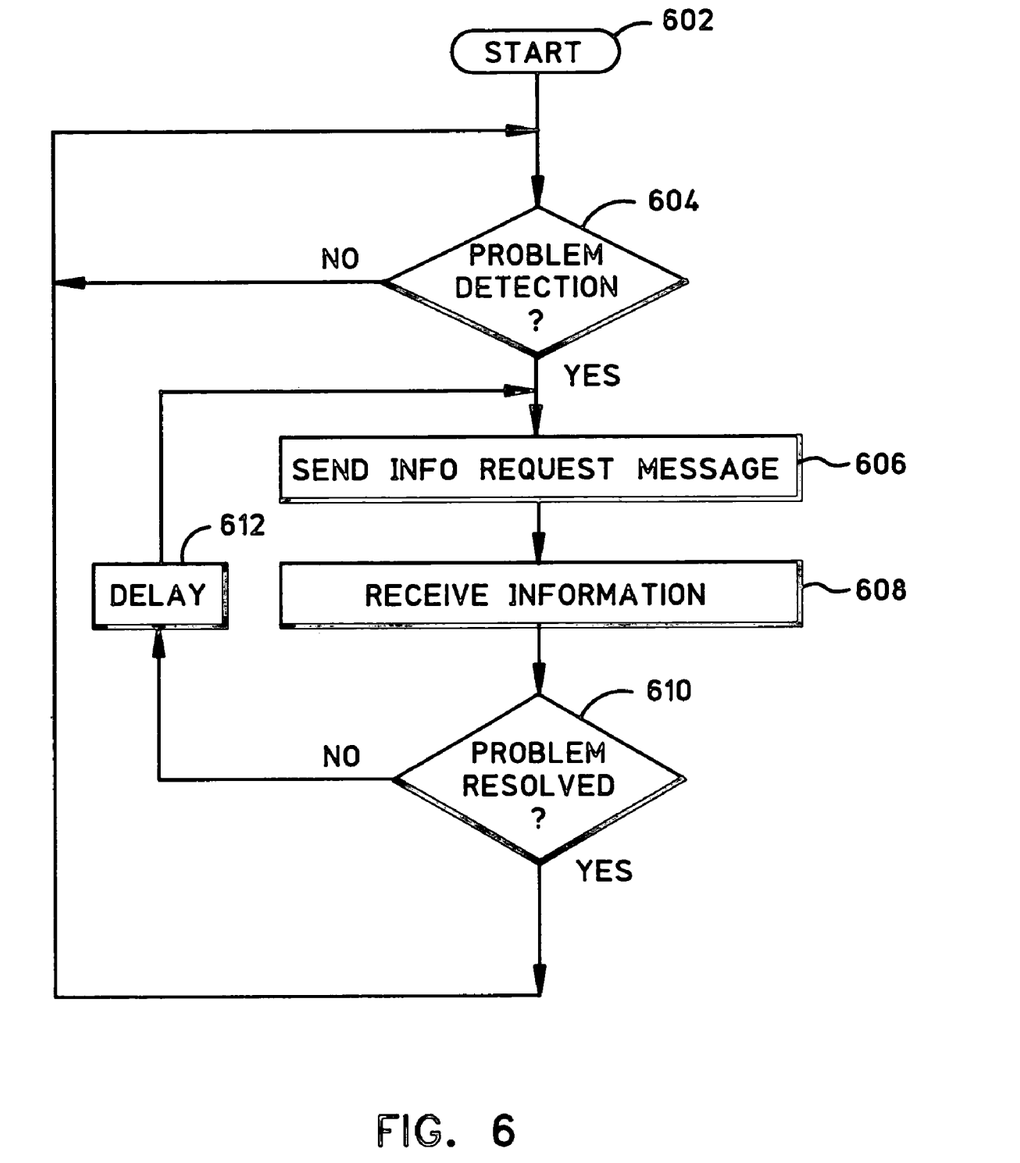
FIG. 6 is a flowchart describing another polling method for use by the wireless base unit, which involves detection of a problem or failure.

FIG. 6 is a flowchart describing another polling method for use by wireless base unit 106. Beginning at a start block 602, steady state operation is assumed where no polling is occurring. Wireless base unit 106 detects a problem within the system (step 604). In response, wireless base unit 106 initiates the polling process, sending an information request message (step 606), receiving information (if at all) (step 608), and delaying for a predetermined time period (step 612) before repeating the sending and repeating. The problem detected may be, for example, a communication failure or a power failure. If it is detected that the problem has been corrected (step 610), then polling ceases where wireless base unit 106 discontinues the sending of information request messages. The method is repeatable, beginning again at step 604.

A communication failure may occur, for example, when high speed data traffic cannot be (accurately) detected over the data traffic channel. Here, controller 318 detects a communication failure and, in response, the polling is initiated. On the other hand, a power failure may occur when energy source 316 is unavailable to wireless transceiver unit 104. In this case, power management circuitry 308 switches battery backup circuitry 310 to electrically power wireless transceiver unit 104 for seamless operation. Controller 302 detects the loss of this primary energy source 316 and, in response, sends a message to wireless base unit 106 indicating the same. Wireless base unit 106 receives and detects this problem message and, in response, the polling is initiated.

An additional advantageous step may be included where wireless units 104 and 106 tear down the established data traffic channel after the power failure is detected. A data traffic channel is normally maintained by each unit by sending "keep alive" messages back and forth to one another over the data traffic channel. In tearing down the data traffic channel, then, these messages are no longer sent nor received. Voice communication, however, may still be advantageously maintained even though the data traffic channel is torn down.

Figure 7:
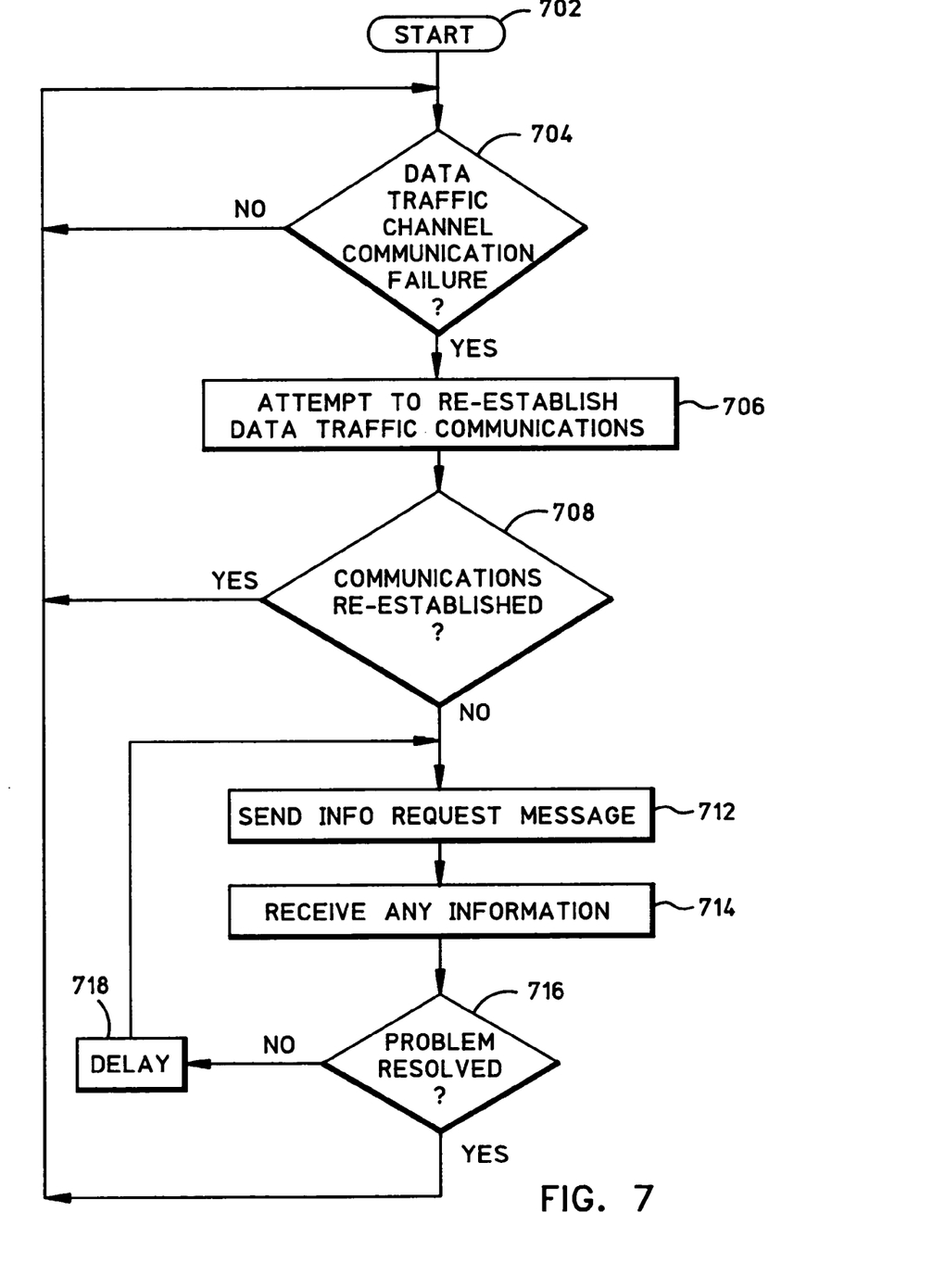
FIG. 7 is a flowchart describing another polling method for use by the wireless base unit, which involves a communication failure over a data traffic channel.

FIG. 7 is a flowchart describing a polling method which relates to the detection of a communication failure over the data traffic channel. Beginning at a start block 702, wireless base unit 106 detects a communication problem with wireless transceiver unit 104 over a data traffic channel (step 704). In response, wireless base unit 106 attempts to reestablish data traffic communications with wireless transceiver unit 104 (step 706). If communication is not successfully reestablished (step 708), periodic polling is initiated with wireless transceiver unit 104, where wireless base unit 106 sends an information request message to wireless transceiver unit 104 over a control channel (step 712), receives information from wireless transceiver unit 104 (step 714), and delays some predetermined time period (step 718) before sending additional information request messages. If the problem is resolved (step 716), the process repeats as shown beginning at step 704.

Figure 8:
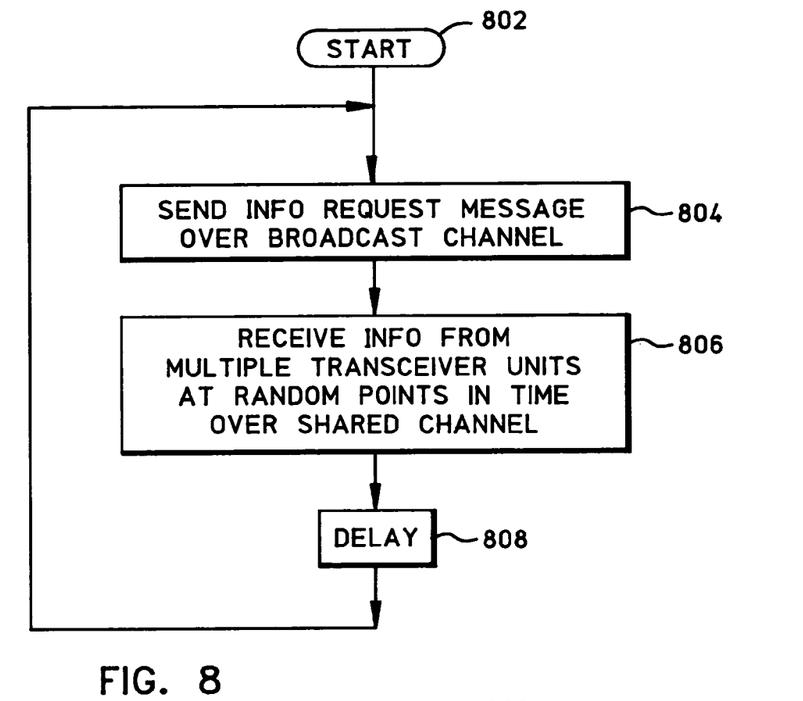
FIG. 8 is a flowchart describing another polling method for use by the wireless base unit, which involves polling multiple transceiver units simultaneously.
Figure 9:
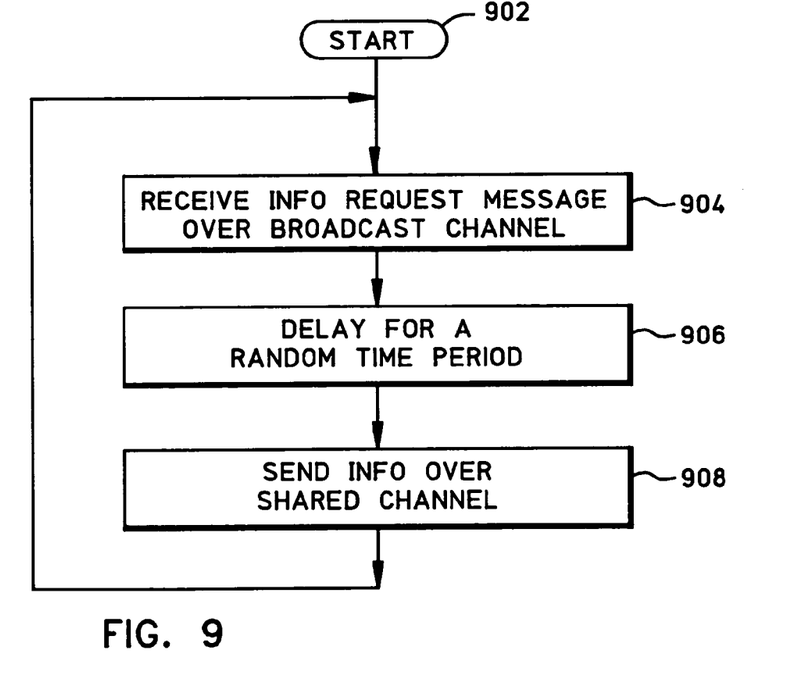
FIG. 9 is a flowchart describing another polling method for use by the wireless transceiver unit, which is associated with the flowchart of FIG. 8.

FIGS. 8 and 9 are flowcharts describing polling methods which involve the simultaneously polling of a plurality of wireless transceiver units. FIG. 8 corresponds to steps performed at a wireless base unit, whereas FIG. 9 corresponds to steps performed at each wireless transceiver unit. Beginning at a start block 802 of FIG. 8, wireless base unit 106 sends a single information request message over a broadcast channel (step 804). This channel may be what is known as a Broadcast channel or BRC. Since it is sent over the broadcast channel, the message is intended for receipt by each wireless transceiver unit 102 that wireless base unit 106 serves. In response, wireless base unit 106 receives information from multiple wireless transceiver units at random points in time over a channel that is shared amongst the plurality of wireless transceiver units 102 (step 806). This channel may be what is known as an Unsolicited Common Access channel or U-CAC. Wireless base unit 106 might not receive information from those one or more wireless transceiver units having failures or problems. Wireless base unit 106 may report the lack of response (problem) for each transceiver unit that did not respond. Next, wireless base unit 106 delays some amount of time (step 808) before repeating the process again beginning at step 804. Preferably, wireless base unit 106 delays for some predetermined time so that its polling is performed on a periodic basis.

From the perspective of each wireless transceiver unit, beginning at a start block 902 of FIG. 9, wireless transceiver unit 104 receives the information request message from the wireless base unit over the broadcast channel (step 904). Wireless transceiver unit 104 delays for some random period of time upon processing the message (step 906). Here, wireless transceiver unit 104 selects a random number using a random number generator and accordingly sets up a timer to expire. After the appropriate delay has occurred, wireless transceiver unit 104 sends information responsive to the information request message over the shared channel (step 908). The process repeats for each information request message sent by wireless base unit. It is noted that after step 904, each wireless transceiver unit 102 does not initially attempt to send its information at the first time available.

Although each wireless transceiver unit sends its information after waiting some random amount of time, all wireless transceiver units send the information within some predefined time period. This predefined time period is less than the delay by wireless base unit 106 utilized in step 808 of FIG. 8. In addition, it is preferred that each wireless transceiver unit 102 feeds a "seed" to its random number generator. The seed is preferably an identification number that is unique to the wireless transceiver unit, such as a hardware serial number. This helps ensure that each wireless transceiver unit does not transmit at the same time as any other wireless transceiver unit.

Thus, polling methods and apparatus for use in a wireless communication system, such as a fixed wireless communication system, have been described. One polling method includes the steps of sending, from a wireless base unit, an information request message; receiving, at a wireless transceiver unit, the information request message; sending, from the wireless transceiver unit, information responsive to the information request message; and receiving, at the wireless base unit, the information. The above steps are preferably repeated on a regular or a periodic basis. The information that is polled from the wireless transceiver unit may be, for example, status information, configuration data, or call record data.

The polling method may be initiated upon detecting a problem or failure, such as detecting a power failure at the wireless transceiver unit or a communication failure over a data traffic channel available between the wireless base and transceiver units. After detecting such a failure, the data traffic channel may be torn down to conserve power at the wireless transceiver unit. The polling methods may also involve sending an information request message over a broadcast channel, such that a plurality of wireless transceiver units are simultaneously polled. Here, each wireless transceiver unit delays a random period of time before sending its information back to the wireless base unit over a channel that is shared amongst the transceiver units to avoid simultaneous transmission.

It should be readily apparent and understood that the foregoing description is only illustrative of the invention and in particular provides preferred embodiments thereof. Various alternatives and modifications can be devised by those skilled in the art without departing from the true spirit and scope of the invention. Accordingly, the present invention is intended to embrace all such alternatives, modifications, and variations which fall within the scope of the appended claims.

What is claimed is:

1. A polling method for use in communicating information by a wireless transceiver unit to a wireless base unit, the wireless transceiver unit and the wireless base unit being configured to communicate over a wireless control channel and a wireless voice traffic channel, the polling method comprising:
    receiving an information request message at the wireless transceiver unit over the wireless control channel;
    in response to the information request message, sending call record information related to usage of the wireless voice traffic channel from the wireless transceiver unit to the wireless base unit over the wireless control channel; and
    repeating the receiving and sending on a regular basis.

2. The polling method according to claim 1, further comprising:
    initiating the repeated receiving and sending in response to a detected problem.

3. The polling method according to claim 1, further comprising:
    detecting a problem at the wireless transceiver unit;
    in response to detecting the problem, sending a problem detection message from the at the wireless transceiver unit to the wireless base unit; and
    initiating the repeated receiving and sending in response to the problem detection message.

4. The polling method according to claim 1, wherein the wireless transceiver unit and the wireless base unit are further configured to communicate over a wireless data traffic channel, the method further comprising:
    detecting a communication failure on the wireless data traffic channel; and
    initiating the repeated receiving and sending in response to detecting the communication failure.

5. The polling method according to claim 1, further comprising:
    detecting that a power failure has occurred; and
    initiating the repeated receiving and sending in response to detecting that the power failure has occurred.

6. The polling method according to claim 1, further comprising:
  delaying a random period of time prior to sending the call record information.

7. The polling method according to claim 1, wherein sending comprises sending the call record information over a shared wireless control channel, the polling method further comprising:
  delaying a random period of time prior to sending the call record information over the shared wireless control channel.

8. The polling method according to claim 1, wherein the information request message comprises data indicative of a requested call record information type and the call record information sent corresponds to the requested call record information type.

9. A polling method for use in communicating information from a wireless transceiver unit to a wireless base unit, the wireless transceiver unit and the wireless base unit being capable of communication over a wireless control channel and a wireless voice traffic channel, the polling method comprising:
  sending an information request message from the wireless base unit to the wireless transceiver unit over a wireless communication channel, the information request message requesting call record information related to usage of the wireless voice traffic channel;
  at the wireless base unit, receiving call record information from the wireless transceiver unit over the wireless control channel in response to the information request message; and
  repeating the sending and receiving on a regular basis.

10. The polling method according to claim 9, further comprising:
  initiating the repeated sending and receiving in response to a detected problem.

11. The polling method according to claim 9, further comprising:
  receiving a problem detection message at the wireless base unit from the wireless transceiver unit; and
  initiating the repeated receiving and sending in response to the problem detection message.

12. The polling method according to claim 9, wherein the wireless transceiver unit and the wireless base unit are further configured to communicate over a wireless data traffic channel, the method further comprising:
  detecting a communication failure on the wireless data traffic channel; and
  initiating the repeated receiving and sending in response to detecting the communication failure.

13. The polling method according to claim 9, wherein the wireless transceiver unit and the wireless base unit are further configured to communicate over a wireless data traffic channel, the method further comprising:
  detecting a communication failure on the wireless data traffic channel;
  tearing down the wireless data traffic channel but not the wireless voice traffic channel after detecting the communication failure; and
  initiating the repeated receiving and sending in response to detecting the communication failure.

14. The polling method according to claim 9, further comprising:
  detecting that a power failure has occurred; and
  initiating the repeated receiving and sending in response to detecting that the power failure has occurred.

15. The polling method according to claim 9, wherein sending the information request message comprises broadcasting it for receipt by a plurality of wireless transceiver units, the polling method further comprising:
  receiving the call record information from each one of the wireless transceiver units at random points in time.

16. The polling method according to claim 9, wherein sending the information request message comprises broadcasting it for receipt by a plurality of wireless transceiver units, the polling method further comprising:
  receiving call record information from each one of the wireless transceiver units at random points in time over a shared wireless control channel.

17. The polling method according to claim 9, wherein the information request message comprises data indicative of a requested call record information type and the call record information sent corresponds to the requested information type.

* * * * *